HAMMER CONTROL CIRCUIT FOR HIGH SPEED PRINTERS

Filed Sept. 25, 1961 10 Sheets-Sheet 1

INVENTOR.
HARRISON I. CRAIG
ARVIN D. McGREGOR
BY Whittemore, Hulbert & Belknap
ATTORNEY May 25, 1965 H. I. CRAIG ETAL 3,185,082

HAMMER CONTROL CIRCUIT FOR HIGH SPEED PRINTERS

Filed Sept. 25, 1961 10 Sheets-Sheet 4

HAMMER CONTROL CIRCUIT FOR HIGH SPEED PRINTERS

HAMMER CONTROL CIRCUIT FOR HIGH SPEED PRINTERS

Filed Sept. 25, 1961 10 Sheets-Sheet 6

HAMMER CONTROL CIRCUIT FOR HIGH SPEED PRINTERS

Filed Sept. 25, 1961

HAMMER CONTROL CIRCUIT FOR HIGH SPEED PRINTERS

Filed Sept. 25, 1961

10 Sheets-Sheet 9

HAMMER CONTROL CIRCUIT FOR HIGH SPEED PRINTERS

United States Patent Office 3,185,082
Patented May 25, 1965

3,185,082

HAMMER CONTROL CIRCUIT FOR HIGH SPEED PRINTERS

Harrison I. Craig, Detroit, and Arvin D. McGregor, West Bloomfield Township, Mich., assignors, by mesne assignments, to Control Data Corporation, Minneapolis, Minn., a corporation of Minnesota Filed Sept. 25, 1961, Ser. No. 140,616
16 Claims. (Cl. 101—93)

This invention relates to printers for use with electronic computers, and particularly to a novel electromechanical, so-called "on-the-fly" type printer. More specifically, this application relates to the Hammer Cycle and Unregulated Voltage Check Circuit of the printer.

Very briefly, a printer embodying the invention includes a continuously rotated print drum having characters spaced radially around the drum in horizontal rows of identical characters to be printed. Printing takes place by causing hammers to drive the paper into the characters on the drum.

The printer disclosed herein may be used in conjunction with a computer-buffer combination as a medium and/or high speed data processing system. For example, the particular embodiment of the printer disclosed herein is capable of printing 120 character lines at a rate of 150 lines per minute, and under special circumstances at a rate of 600 lines per minute for all numeric characters. The computer drives the necessary information and places it on its output terminals in such a way that it is fed into the printer one line at a time. After the computer has completed the derivation of one line of information, it then derives the vertical format or number of lines which the computer desires to skip on a printed sheet before it prints the next line. This information is also fed out onto the computer output lines and used by the printer.

Before stating some of the specific objects of the invention and describing the construction and operation of the printer in detail, it seems desirable to present a general discussion thereof for purposes of orientation. In this connection, the assumption will be made that the computer with which this printer is employed sorts its information in terms of character bins. In other words, as the computer looks at information in its arithmetic register system, it determines two things about a particular character of information. First, it determines what character it wishes to print; second, it determines at what address or hammer number from 1 to 120 it wishes to print this character. A portion of the memory in this printer has been designated for the addresses of each character. Since this particular embodiment of the printer is designed to print no more than 120 characters on any given line, 120 positions in memory have been assigned for addresses of each character, either alphanumeric or numeric, which it is desired to print.

After the computer has processed the information which it wishes to print and has placed all addresses in their appropriate character bins, the computer is then prepared to output this information to the printer-buffer combination. When the computer is in its print mode of operation, it receives information from the printer telling it which character the printer is capable of printing. The computer then sorts through the appropriate bin, locating the addresses of all positions which the computer desires to print. These addresses are fed in sequence through the buffer, amplified and impedance matched by the buffer and then fed to the input register of the printer. The printer input register decodes the computer signals and pulses appropriate hammer magnets, causing the selected hammers in the printer to be triggered and dropped into a print cam so as to print the character.

After the computer has determined that one complete line of information has been sent to the printer, it then determines the vertical format or number of lines to be skipped on the printed form before the next line is printed. This skip information is then placed on the output lines of the computer, reduced by the buffer, and subsequently fed into the input register of the printer. At the end of the paper skip period, the printer feeds an input request signal back to the computer telling the computer that it is ready to print the next line of information. The computer then reduces the next line of information, repeats the previous sequence of accepting characters to be printed from the printer, and places the addresses of these characters on the output lines of the computer to be fed into the input register of the printer.

In most instances, a computer such as that presently under discussion for orientation purposes will be connected through its input-output lines to several pieces of equipment in addition to the printer. This other equipment may be tape readers, card readers, tape punches, or perhaps another computer. As the computer attempts to communicate with any one of the several units of such peripheral equipment attached to it, there is the possibility of causing malfunction in one of the other pieces of equipment. Steps must therefore be taken to insure that only the selected piece of equipment is able to send or receive information. Thus, the buffer referred to above is placed between the computer and the printer to insure that no information is received from the printer and that no information is fed into the printer input register, except at times when the printer has been selected by the computer as an output device. The buffer accomplishes this function by controlling the gating of both the computer input to the adress register and the printer output from the character generator. The buffer detects the printer select code from the computer and uses this code to enable or inhibit the gates in the buffer system. In addition to accomplishing the gating function, the buffer also serves as an impedance matching device between the output of the computer and the input to the printer, and between the output of the printer and the input of the computer.

The printer is designed to be a general purpose device that can adapt itself to most types of computers. However, cases occur where the printer cannot directly use either the wave shapes or the voltage levels which may be placed on the computer output line. In these cases, pulse forming and gating networks in the buffer are used to re-shape the pulses. Specific illustrations are the strobe line, which must be delayed from the computer information ready line, and the paper advance command, which is derived from the computer paper advance command but is re-shaped. The printer input register reset command is also derived in the buffer from computer output.

As will be seen from the subsequent detailed description, the specific printer disclosed therein involves the use of certain magnets associated with each print hammer, and a basic objective in the design of this printer is to energize the correct print magnets at the proper time to enable the selected hammers to fall into a print cam and be driven against the proper character on the print drum. The selection of one of the 120 print magnets is accomplished by the computer input decoding system, which uses the address placed on the input lines by the computer to set a group of input flip-flops, seven in this particular printer design. These seven printer input flip-flops are used in conjunction with a double level gating system to define one of 120 unique print positions. When the seven computer input lines define one print magnet, this input signal causes a circuit called a print magnet thyristor to be turned on through a resistor. Turning on the thyristor allows selection of the proper print magnet.

Synchronization between release time of the print hammer associated with the triggered print magnet and a mechanical print cam is accomplished through use of a variable reluctance magnetic pickup. This magnetic pickup senses the position of the lobes formed on the print cam and is used to trigger the printer control timer. The printer control timer is an interrelated group of one-shot multivibrators that determines the length of each portion of one print cycle. A print cycle is defined as the time required for succeeding rows of identical characters on the print drum to pass a fixed line, such as the line of print hammers; in the particular printer disclosed, it covers a period of 6.25 milliseconds.

The above print cycle is itself divided into three different times referred to herein as the reset time, the read time, and the type command time. More specifically, the reset time is a period of one-half millisecond following detection of a lobe on the print cam; during this period, the thyristors, which control the 120 print magnets and have been previously energized, are simultaneously turned off or put at zero position.

During the next two milliseconds, the read time, a printer input request signal is generated by the control timer. This printer input request signal is processed through the buffer and fed into the computer, telling the computer, so to speak, that during these two milliseconds time is available to feed the addresses of particular characters into the printer. The computer then scans the printer character generator for the character on the print drum approaching the print hammer positions and places the addresses of all positions for this character in storage on the computer output lines. During this two millisecond printer input request or read time, all thyristors at hammer positions called for by the computer are thus energized.

The following 3.75 milliseconds of the print cycle, the type command time, are taken up by the print magnet power period or type command. During this time, a high current pulse is gated to all hammer magnets whose thyristors have previously been selected. At the end of the 3.75 millisecond type command period, all hammers requested by the computer will have been positioned in the path of the print cam. The next cam lobe is then sensed by the magnetic pickup, and a new reset signal is generated to turn off all thyristors in the unit.

The paper moving means employed in this printer includes a solenoid controlled spring clutch. Thus, in addition to energizing the proper print magnet at the proper time, another basic objective of this printer design is to energize the spring clutch solenoid at the proper time and for the proper length of time. In this case, the length of time is critical. A 10 millisecond input signal to the spring clutch solenoid will result in paper motion on one line; energizing the clutch for multiples of 10 milliseconds will result in multiple line skip. In the present system configuration, the spring clutch solenoid is fed with two levels of signal, a first high power system and a second low power system. The first level of signal is a high current 10 millisecond signal insuring that the solenoid, and thus the spring clutch, is energized rapidly and positively and resulting in paper motion of one line; the second input is a paper vertical format control of lower level which may be sustained for continuous duty and which will cause the spring clutch to continue to be energized, although it may not insure actuation of the spring clutch. When single line skip mode is required, the vertical format control system will not be energized; where multiple line skip is required, the computer will feed a paper skip signal into the input decoding system, the skip signal being subsequently decoded and used to energize one of eight printer OR gates.

The vertical format control is a photodiode system comprising an eight channel photodiode paper tape read mechanism, the paper tape motion being mechanically synchronized with the motion of the paper drive spring clutch. Actually, there are nine photodiode channels, but one is used for strobe. Each of the other eight channels of the paper tape may comprise a commonly used print format. By gating together one of the eight printer AND gates elected by the input decoding system and the eight channels of output from the vertical format control photodiode system, it is possible to select one of eight commonly used paper formats with the computer. The selected channel is then fed into the paper vertical format control system and is used to stop paper motion at the appropriate time.

The printer includes a print drum character generator comprising a code disk photodiode system. The code disk is mechanically fastened to the print drum mechanism, and it generates a parallel character synchronized with the character on the print drum. The output of these photodiodes are amplified and impedance matched in the buffer and gated to the computer at all times when the buffer is in the printer select mode.

It has already been stated that the printer under consideration is designed to print a maximum of 120 characters per line and that it involves the use of magnets associated with the print hammers. Actually, the printer contains 120 polarized magnets, called hammer electromagnets, associated with print positions 1 through 120. Each electro-magnet has two windings, a holding coil winding and a pulse coil winding. The holding coil winding is continuously energized during operation of the printer and has sufficient strength to hold a print hammer interposer system, which includes an actuator lever having an armature, clear of the print cam. The pulse coil is wound on the same bobbin with the holding coil. The ampere turns of the pulse coil exceed those of the holding coil, and they are so sensed when energized that they oppose the force of the holding coil, thus freeing the print hammer armature and enabling the print hammer to be operated by the print cam each time a pulse coil is energized. All of the 120 pulse coils are driven in parallel by a type command power amplifier, but only hammers selected by the hammer magnet trigger gate system will be printed.

As already explained, the synchronizing magnetic pickup referred to above senses the time at which a particular character is beginning to appear beneath the hammer and resets all pulse coil thyristors, reset occupying 0.5 millisecond. During the next two milliseconds of the print cycle, the printer is prepared to receive the address of all hammers which the computer desires to print on the particular character beneath the hammers. It is during the remaining 3.75 milliseconds of the print cycle, that power is applied to all of the pulse coils in parallel, and any hammers which have been thus selected during the input request period will be released into the print cam.

While type command power is applied to all pulse coils, only selected pulse coils will be energized. The electrical circuit is completed from a type command power amplifier buss, through the selected pulse coil and then through the thyristor of the selected units to ground. The thyristor is a semiconductor device having characteristics similar to those of a vacuum tube thyratron. The thyristor may be turned on with a low level short duration signal on the base, but it must be turned off by reducing thyristor circuit current to a level which is less than the device sustaining current. Turn off of all thyristors is accomplished in parallel by driving both the reset buss and the type command power amplifier buss to 0 volts simultaneously for a period of 0.5 millisecond. Each thyristor may be selected and turned on in less than 7 microseconds, and all 120 thyristors may thus be serially selected in appreciably less than the 2 milliseconds of input request time. The reset power amplifier buss is driven by a transitorized emitter follower system; the emitter follower, in turn, is driven by a 0.5 millisecond reset buss control one-shot multivibrator, the multivibrator being triggered by the synchronizing magnetic pickup. The type command power amplifier buss is driven by a transistorized emitter follower system which in turn is driven by a type command control flip-flop. The type command control flip-flop is set by the trailing edge of the signal from the printer input request one-shot multivibrator, and it is reset by the leading edge of the signal from the reset buss one-shot multivibrator. The printer input request one-shot multivibrator is triggered by the trailing edge of the reset signal and switches for 2 milliseconds, feeding a signal back to the computer-buffer system which may or may not be differentiated.

All thyristors are reset or turned off at the beginning of a print cycle by causing the printer reset command and the printer type command busses to simultaneously go to 0 volts, reducing the current through the thyristors below the sustaining current level. During the following 2 milliseconds, voltage will be applied to the thyristor collector through the printer reset command and buss, but no voltage will be applied to the hammer magnet pulse coils through the printer type command buss. This allows the thyristors to be selected and turned on into a non-inductive load in serial order, and it insures that all hammer magnet pulses are of equal length. Turn off or leakage current is supplied to the base of the thyristor through a resistor to the power supply. Turn on current is supplied through an isolated diode by a resistor-capacitor network connected to the computer input decoding system.

Referring again to the computer input decoding system consisting of seven printer input flip-flops which receive and store the address of the particular character that the computer wishes to print, the state of the seven input flip-flops is used to define one of the 120 unique hammer positions through the two level gating system. The true and prima sides of the first three flip-flops are used to drive eight diode AND gates; the outputs of the other four flip-flops are used to drive fifteen OR gates. The product of the fifteen OR gates and the eight AND gates are used to drive the resistor-capacitor input networks to 120 hammer magnet thyristors.

It is possible that the switching speeds of the seven input flip-flops are not identical. If the transient signals during the set and reset time of these flip-flops is allowed to propagate through the gates, a hammer may be erroneously selected. The gate system is therefore inhibited by a stobe signal during input flip-flop set and reset times. This strobe is derived by the buffer and fed through the strobe or matrix trigger input amplifier to a fourth input on each of the eight AND gates. The thyristor requires a negative going base current of 5 milliamperes for a period of 150 microseconds to ensure turn on. This base current is derived by charging the input capacitor at a slow rate for a minimum of 6 microseconds, and discharging the input capacitor through the thyristor base for a minimum of 150 millimicroseconds. Gate current requirement during the capacitor charge cycle is low due to the large input network series resistor. Gate current requirement is also low during the capacitor discharge cycle, due to the fact that only one of the 120 input capacitors has been charged, and must therefore be discharged. The outputs of both the AND and the OR gates are either 0 or plus 10 volts. The combination which produces triggering of the thyristor is a 0 voltage out of the OR gate and plus 10 volts out of the AND gate; this causes the thyristor input capacitor to be charged to 10 volts, with the minus polarity facing the thyristor input diode. When the AND gate potential switches from plus 10 to 0 volts, the capacitor discharges through the base of the thyristor, causing the device to turn on.

When the computer-buffer system determines that all required information has been printed on one particular line of the data sheet, the start paper advance input signal will be generated and fed into the printer. Since the start paper advance signal is a 1.2 milliampere signal of 8 microsecond minimum duration with maximum rise time of 0.3 microsecond, it is possible, in the case of some computer-buffer systems, for this start paper advance signal to be derived and sent to the printer before the mechanical operation of completing printing has been finished. When the printer receives a start paper advance signal and the spring clutch causes the paper motion mechanism to start while print hammers are still striking the paper, the paper feed holes may be elongated or torn. To prevent this, a start paper advance delay one-shot multivibrator is inserted between the start paper advance input and the start paper advance control multivibrator, this delay insures that print hammer motion will have been completed before paper motion begins.

The inertia in the paper drive mechanism is sufficient so that a damped oscillation takes place at completion of paper advance; if hammers are allowed to fall on the paper during this oscillation time, "haloing" or deterioration of print quality may occur. Accordingly, a printer input request inhibit signal is sent to the computer-buffer system to prevent input to the printer until paper motion has been damped out. The printer input request inhibit signal is derived by monitoring the high power and low power paper drive systems and using the end of the paper drive signal to trigger a printer input request inhibit one shot multivibrator. The delay inherent in this multivibrator insures that no print signals are received until paper motion has been mechanically damped out.

The high power paper drive amplifier is a conventional, common-emitter power amplifier driven by an emitter follower power amplifier which in turn is driven by a ten millisecond start paper advance one-shot multivibrator. The start paper advance input causes a ten millisecond power pulse to appear across the spring clutch control solenoid. This pulse is long enough to insure actuation of the spring clutch system long enough to insure one line of paper advance, but not long enough to allow two lines of paper advance. When the printer is in the multiple line skip mode and the clutch control solenoid is being energized by the low power paper drive amplifier, the time at which the solenoid is de-energized to stop paper advance is very critical. For a given number of lines of paper skip, if the electrical signal to de-energize the solenoid is given too soon, one line too few of paper advance will result; if the electrical signal is given too late, one more line of skip than is requested by the computer will result.

To insure that the control solenoid energization is properly synchronized, the electrical signal to the low power paper drive amplifier system is derived from the vertical format control photodiode system. The vertical format control photodiode system comprises an eight channel photodiode block, a punched paper tape transport mechanism mechanically connected to the printer paper motion mechanism and a light-lens system to illuminate the photodiodes.

The lower power paper drive system, which is used to maintain the spring clutch control solenoid energized during multiple line skip, is driven by a paper drive format control flip-flop. This flip-flop is set by the same start paper advance input signal which energizes the high power paper drive one-shot multivibrator. When the printer is in the single line skip mode, both the start paper advance one-shot multivibrator and the paper drive format control flip-flop are energized, giving both high power and low power paper drive signals to the spring clutch solenoid. However, the paper drive format control flip-flop is reset by the stop paper advance signal before completion of one line of paper advance. In the multiple skip mode, both high power and low power paper drive systems are energized by the start paper advance input. The stop paper advance signal, which resets the paper drive format control flip-flop, is derived from the selected channel of the vertical format control photodiode system. Selection of this channel may be accomplished in one of two ways: A manual switch may be used, or one of the eight photodiodes channels may be selected by the computer-buffer system and gated to the stop paper advance AND gate. In this way, the signal which controls the number of lines of paper skip is derived from a system that is mechanically coupled to the paper drive mechanism, which insures that the paper stop signal arrives at the printer electronics in proper time sequence. A change of paper tape in the reader allows a maximum of flexibility in selection of paper format.

It will be understood, of course, that the specific voltage and current values and the times stated in the above general discussion are given mainly for the purpose of indicating the mode of operation; that is, they are not in any way intended to be limiting, it being apparent that the printer design could be varied in this respect.

Inasmuch as the print drum is continuously rotated at a relatively high speed and a line of print is completed on a single revolution of the print drum, it is apparent that the print hammer mechanism must necessarily be capable of extremely rapid operation. At the same time, however, the hammer mechanism must give printing of uniform intensity and spacing, be relatively easy to assemble and repair and be dependable in operation.

From the above general discussion of the printer it is apparent that one of the objects of the invention is to provide a printer for use with electronic computers or the like including a printer hammer cycle check circuit.

Another object is to provide a printer for use with electronic computers or the like including a low voltage checking circuit operable to shut down the printer if the unregulated voltage fed to the printer is below a predetermined magnitude.

Another object is to provide a printer as set forth above wherein the hammer cycle check circuit includes means for shutting down the printer when a constant printer type command, or printer read command is present or when no printer reset command is received.

Another object is to provide a hammer cycle check circuit for use in a printer as set forth above wherein the printer is shut down an electric signal gated through a diode on non-conduction of a transistor which transistor is shut off unless a capacitor connected to the base thereof is periodically discharged through a second transistor and the second transistor is energized to discharge the capacitor only when no printer type command is received and no printer read command is present during a printer reset signal.

Another object is to provide a line printer as set forth above wherein the hammer cycle check circuit feeds a signal having a magnitude below a predetermined magnitude to the low voltage checking circuit whenever the unregulated voltage of the printer is below a predetermined magnitude and whenever the print type command or printer read signal are present during the reset signal or a reset signal is not provided, and wherein the low voltage checking circuit is a Schmitt trigger circuit operable on receiving a signal having a magnitude below a predetermined magnitude from the hammer cycle check circuit to energize a relay in the power supply to deenergize the printer.

Another object is to provide a printer hammer cycle and low voltage check circuit which is simple in construction, economical to manufacture and efficient in use.

These and other objects and advantages of the inventionw ill become apparent by reference to the following specification and the accompanying drawings, wherein:

FIGURES 8 and 9 are schematic diagrams which in conjunction with the voltage sensing circuit illustrated schematically in FIGURE 10, the cycle check circuit illustrated schematically in FIGURE 11, and the low voltage checking circuit illustrated schematically in FIGURE 12, illustrate the control circuit of the printer;

FIGURES 13 and 14 illustrate diagrammatically the bail bar of the printer and the associated latch portion of the printer control circuit in the two static positions of the bail bar.

Figure 1:
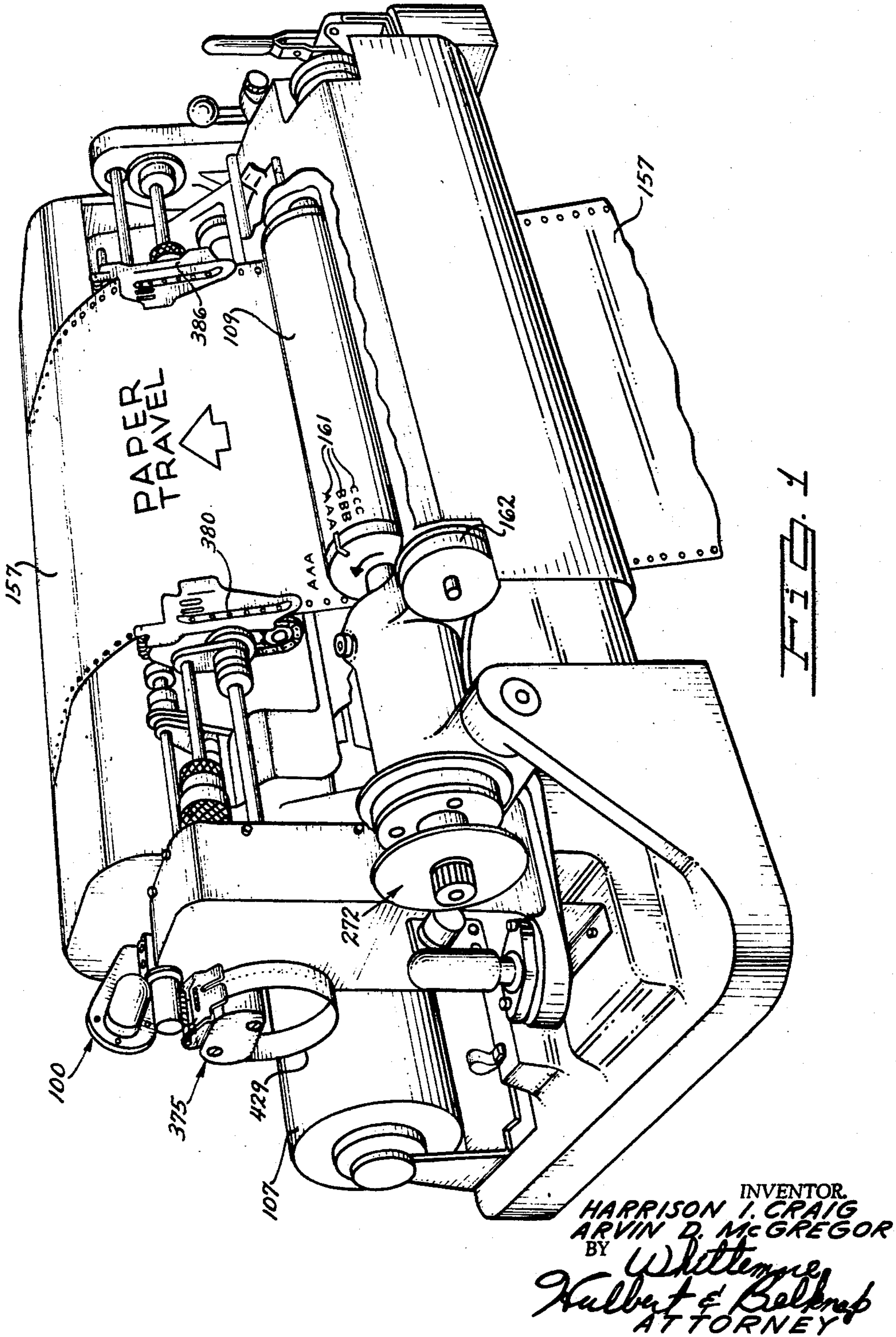
FIGURE 1 is a perspective view of a printer embodying the invention.

Referring now to the drawings in greater detail, a complete printer 100 embodying the invention is generally comprised of three main portions: a mechanical portion, a power supply portion and an electronic portion, the latter portion cooperating with a computer-buffer combination in supplying the various electronic control signals briefly referred to above and necessary for proper operation of the printer.

The mechanical portion of the printer is fully disclosed in application Serial No. 138,157 which is incorporated herein by reference. In that application specific details of the previously (and subsequently) mentioned mechanical, electromechanical and electro-optical features of the printer are illustrated in a manner such that the physical connections and assembly can be seen. Since our invention deals primarily with the electronic features of a printer, we have shown the same electromechanical and electrooptical features schematically as parts of wiring and/or logic figures, except for FIGURE 1 showing a perspective view of the printer of application Serial No. 138,157.

As discussed before, printer 100 is a high speed line printer using sprocketed paper 157 movable in steps through a print station by tractors 380 and 386 under the control of format control device 375 which uses punched tape 429 with a photodiode reader. Format control 375 requires the tractors 380 and 386 to step paper 157 through distances equal to one or more print lines at a time, upon command.

The print station is located behind print drum 109 and confronts the faces of a row of one hundred and twenty print hammers (not shown). Ribbon 162 is moved horizontally through the print station between the hammer faces and the paper. Drum 109 has horizontal rows of raised characters 161 against which the paper is impacted by the addressed hammers engaging the ribbon and driving it against the paper.

The hammers are addressed and actuated by interposer linkages which cooperate with lobes of a rotary cam (not shown). Although the mechanical parts of the printer are driven by motor 107 and are synchronized by a mechanical drive (not shown), it is necessary for advance signals to be provided to the electronics portion of the printer, e.g. as to which row of characters is approaching the print position at any instant. Optical code assembly 272 driven with drum 109 and magnetic pick-up assembly 269 (FIGURE 5) associated with the cam provide such signals.

Other features of the printer which are mentioned below and shown schematically herein are mechanically presented in application Serial No. 138,157.

Figure 5:
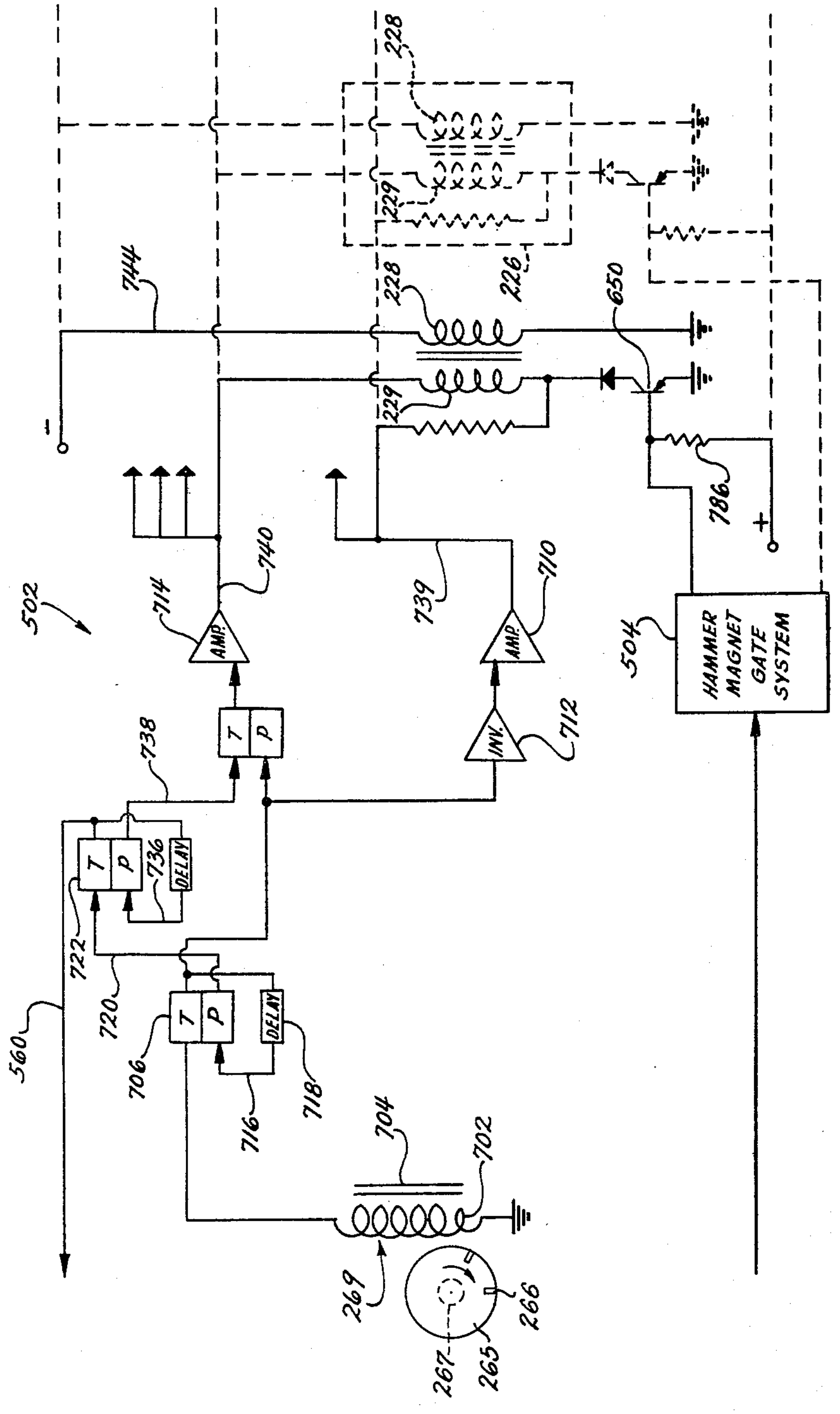
FIGURE 5 is a partly block and partly schematic diagram illustrating the hammer magnet control system of the electronic portion of the printer.
Figure 6:
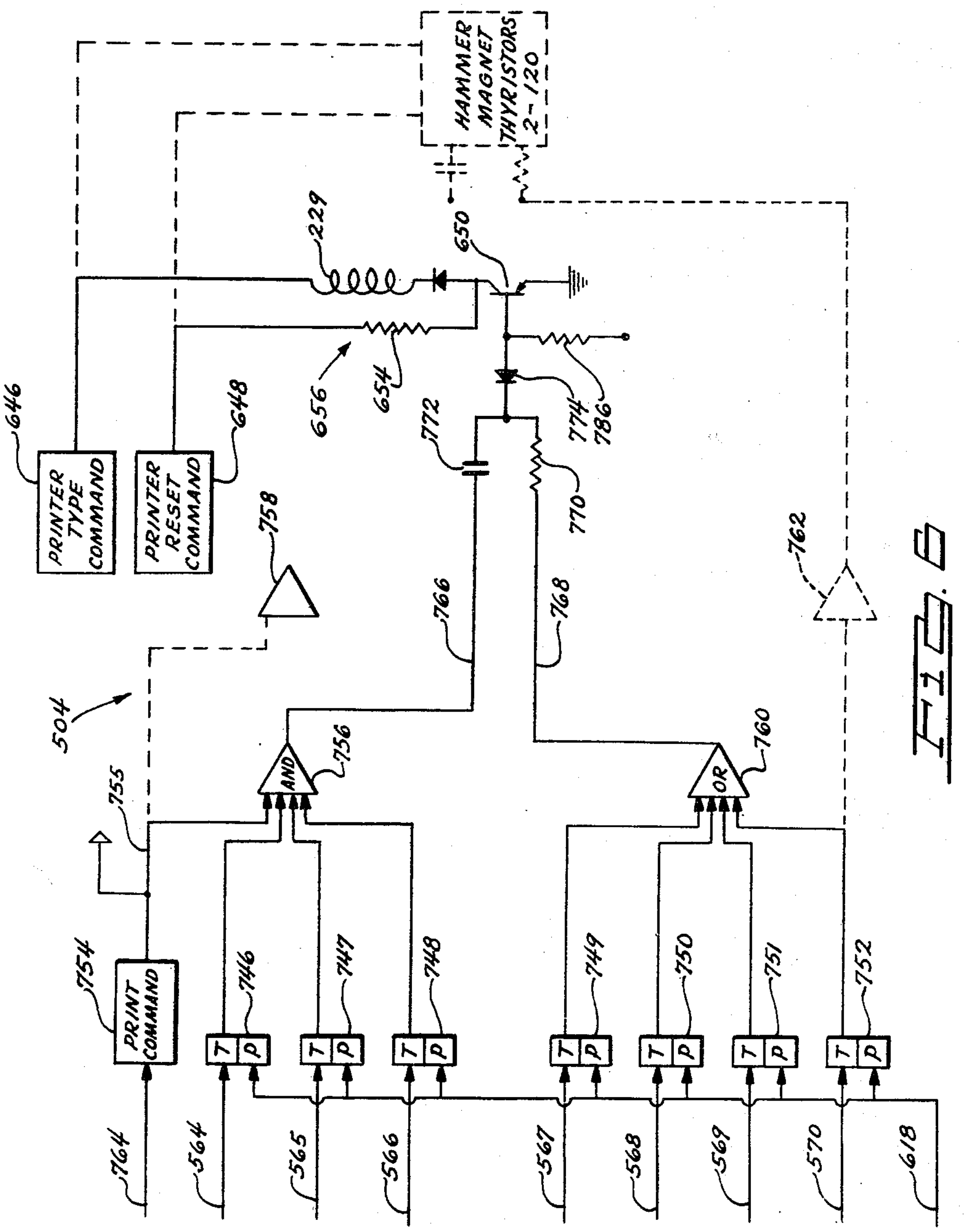
FIGURE 6 is a partly block and partly schematic diagram illustrating the hammer magnet gate system of the electronic portion of the printer.
Figure 7:
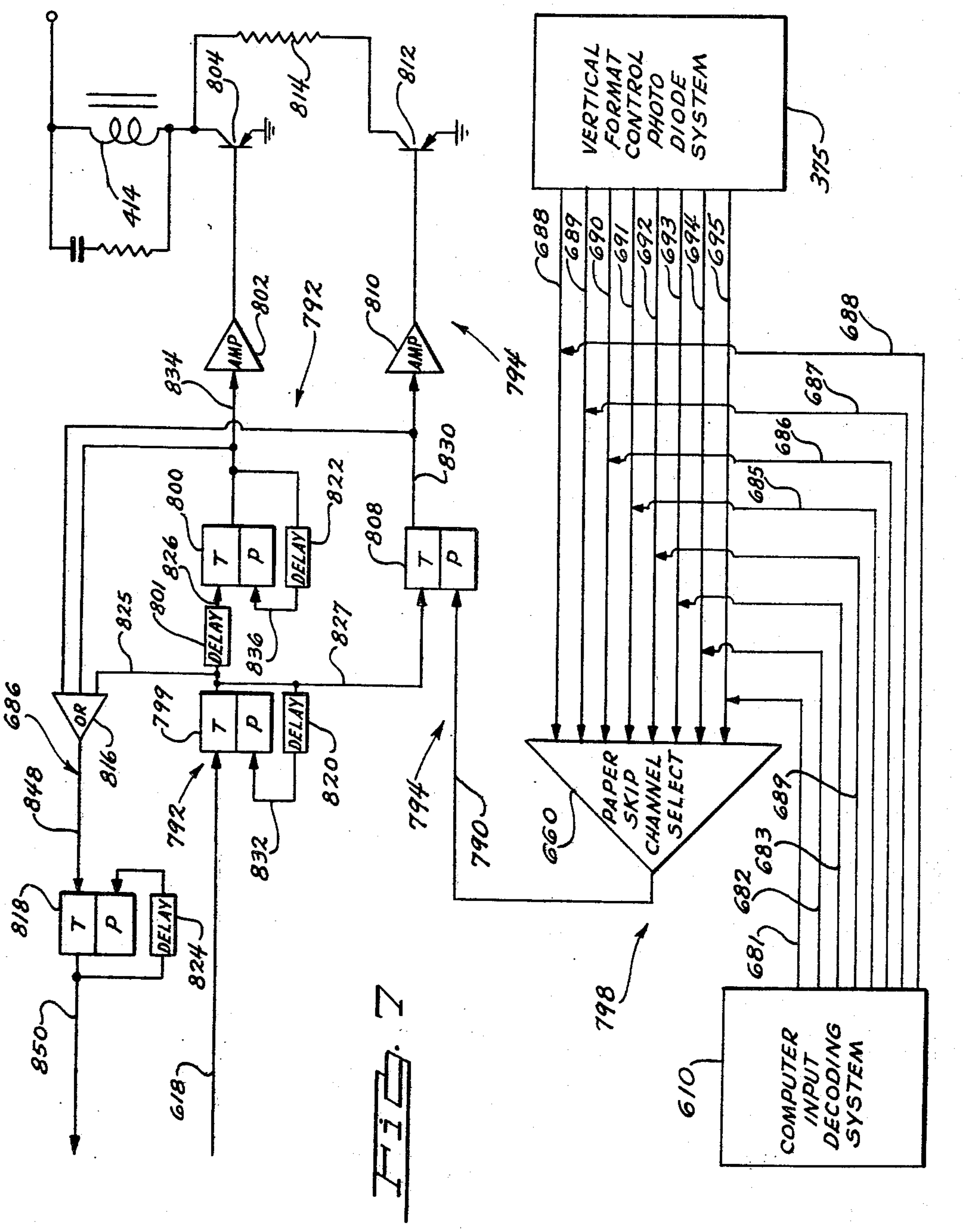
FIGURE 7 is a partly block and partly schematic diagram illustrating the paper motion spring clutch control system of the electronic portion of the printer.

The electronic portion 500 of the printer includes a hammer control system 502, a hammer gate system 504 and a paper motion spring clutch control system 506. The hammer control system 502 illustrated in FIGURE 5 is provided to synchronize the operation of the electronic portion of the printer with the mechanical portion thereof and to sequence the operation of the electronic portion of the printer. The hammer gate system 504 illustrated in FIGURE 6 is provided to prepare the selected printer hammers for actuation in accordance with signals fed to the printer by the computer 508. The paper motion spring clutch control system 506 illustrated in FIGURE 7 is provided to control the advance of paper through the printer in accordance with a predetermined format and to inhibit the input of information to be printed to the printer during paper advance.

Figure 2:
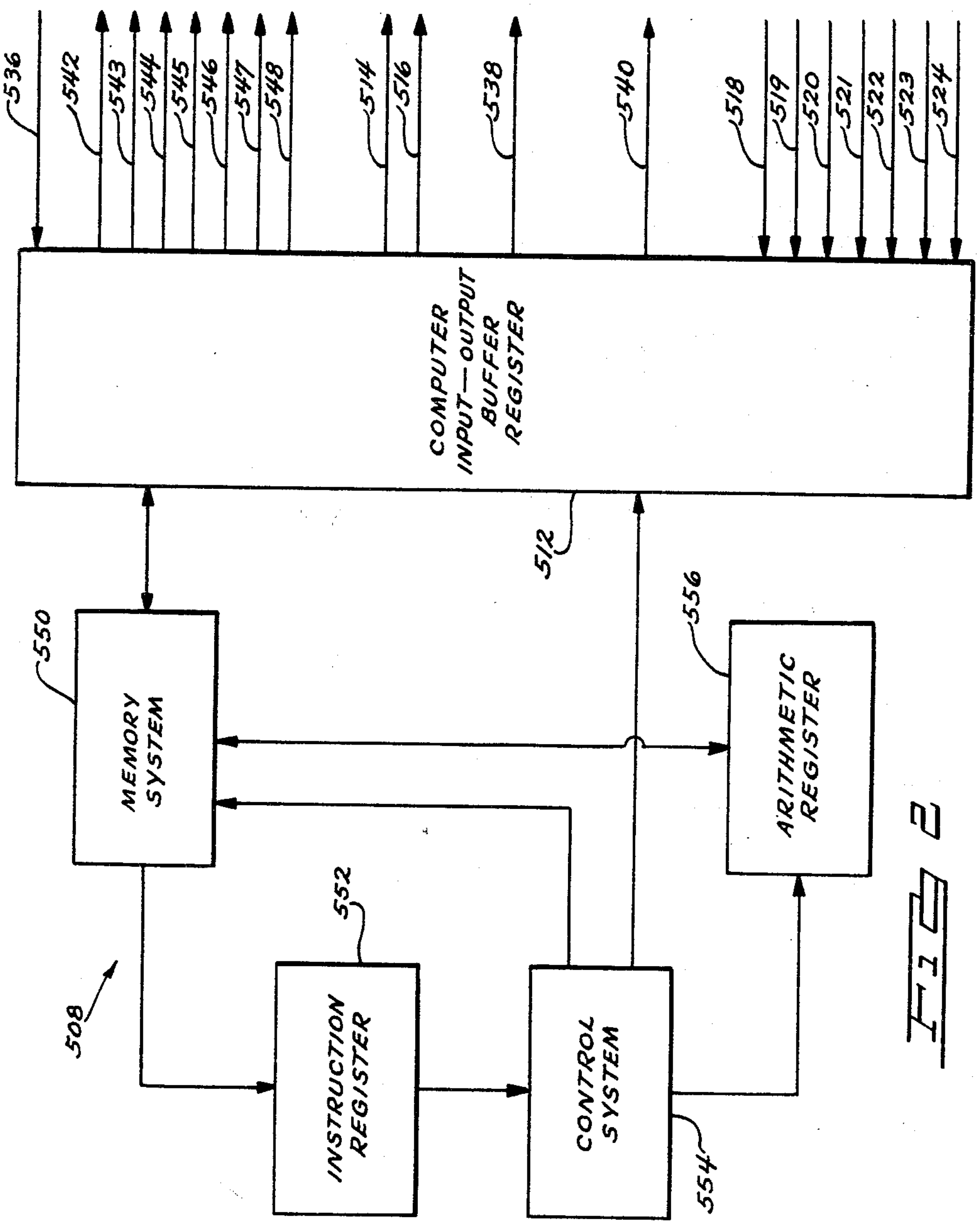
FIGURE 2 is a block diagram illustrating a representative computer with which the printer may be used.
Figure 3:
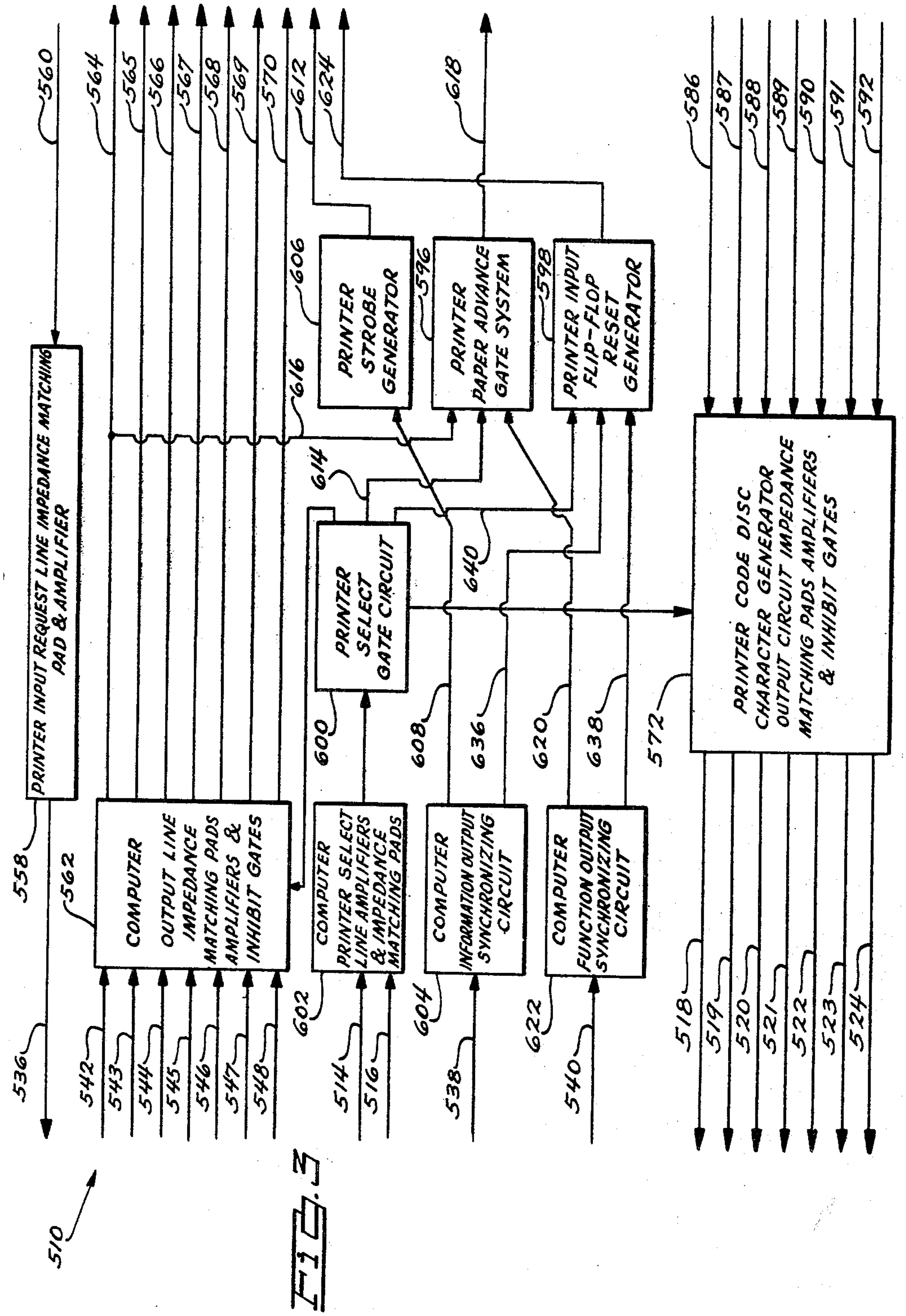
FIGURE 3 is a block diagram illustrating a representative buffer which may be used between the computer illustrated in FIGURE 2 and the printer.
Figure 4:
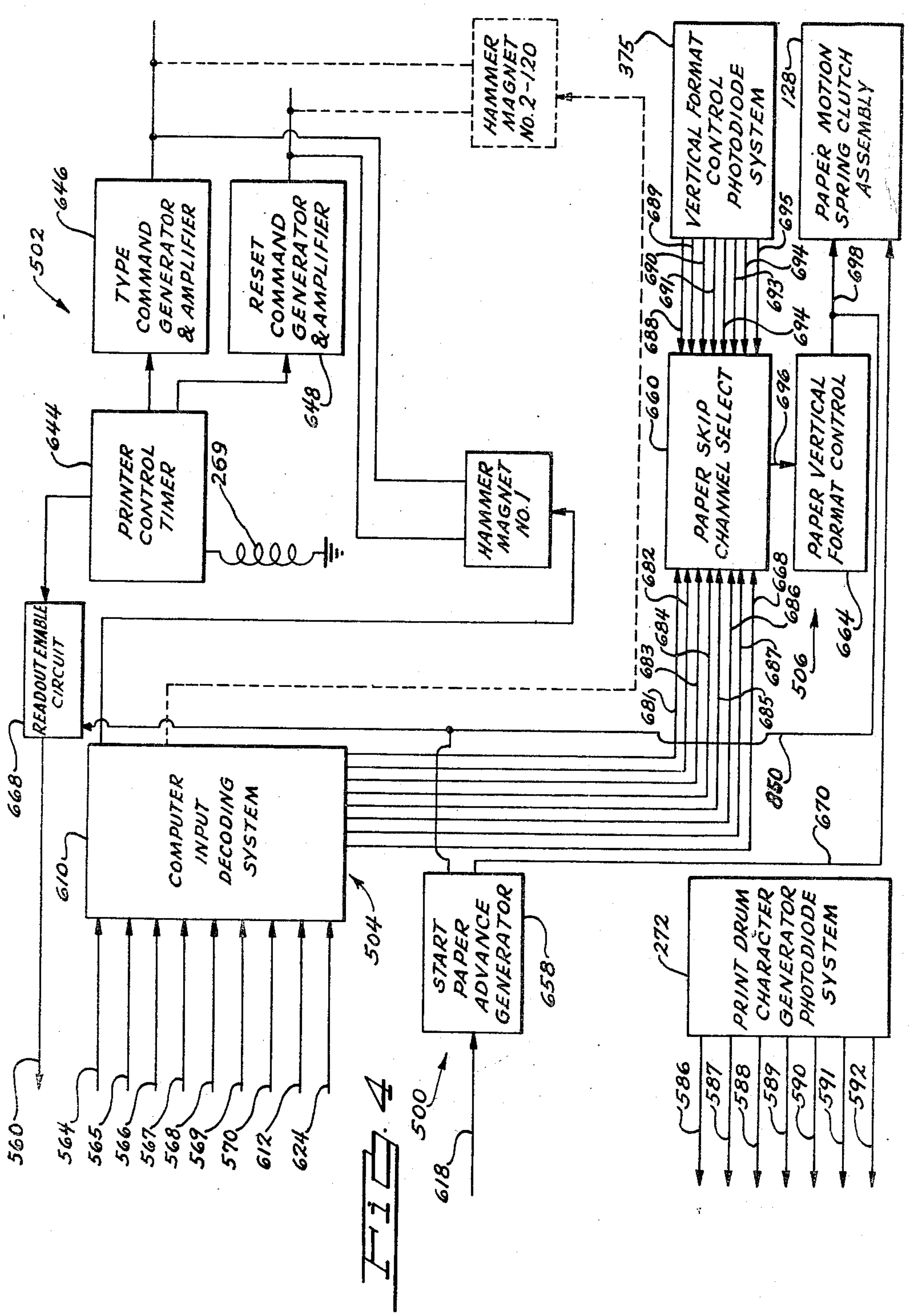
FIGURE 4 is a block diagram illustrating the electronic portion of the printer.

The electronic portion 500 of the printer including the hammer control system 502, hammer gate system 504 and paper motion spring clutch control system 506 shown in block diagram in FIGURE 4 will be considered in detail after briefly considering the relation thereof to the computer 508 shown in block diagram in FIGURE 2 and the buffer 510 illustrated in block diagram in FIGURE 3.

As previously indicated the computer 508 provides both information and function input signals to the printer. The buffer 510 is provided between the computer 508 and the electronic portion 500 of the printer to permit use of the printer with the particular computer.

The computer 508 is conventional and includes a computer input-output buffer register 512, the memory system 550, instruction register 552, control system 554 and an arithmetic register 556 and suitable connections therebetween, as shown diagrammatically in the computer block diagram of FIGURE 2. The computer input and output buffer register 512 includes the computer printer select output conductors 514 and 516, the seven computer input conductors 518–524, the printer input request conductor 536, computer information ready conductor 538 and computor function ready conductor 540 connected thereto.

Since the computer 508 is conventional and forms no part of the present printer invention, it will not be considered in greater structural detail. However, the operation of the computer 508 will be considered briefly to indicate the connection of the printer of the invention thereto, through the buffer 510 and the related functioning thereof.

In operation the computer 508 may be connected through the computer input-output buffer register 512 to a number of different units, such as the printer of the invention, which units operate to program information to the computer or to receive computer outputs in the manner of the printer of the invention either directly or through a buffer, such as 510. Therefore, a signal is produced on the conductors 514 and 516 by the computer when the printer is selected for use with the computer.

Before the printer is selected, however, information which it is desired to print with the printer and printer function information are first programmed into the computer 508 over the computer input conductors 518–524 from a computer input unit, such as a magnetic tape reader (not shown). The computer 508 stores the input information it receives over conductors 518–524 in the memory system 550.

Subsequently the computer control system 554 under instructions from the instruction register 552 either on request from the printer over conductor 536 or independently due to programming operates on the stored input information in the arithmetic register 556 and feeds desired information and function signals to the printer through the buffer 510 from the computer input-output buffer register 512 over computer output conductors 542–548, computer information ready conductor 538 and computer function ready conductor 540.

The buffer 510, as previously indicated, performs the function of impedance matching and amplifying of signals passed directly between the printer and the computer 508. Additionally the buffer gates selected signals between computer 508 and the printer to insure their possible presence only during periods when the printer has been selected for operation with the computer. The buffer also provides a strobe signal to inhibit operation of the printer after information signals have been fed thereto until the information signals are stable. Further the buffer 510 functions to prevent resetting of the printer input flip-flops before the computer information is stabilized thereon and has been used.

Thus the buffer 510 includes the printer input request line impedance matching pad and amplifier 558 positioned between the printer input request conductor 560 from the printer read out enable circuit 668 and the printer input request conductor 536 to the computer 508. Similarly, the computer output lines impedance matching pads, amplifiers and inhibit gates 562 are provided in the buffer between the computer output conductors 542–548 and the printer input conductors 564–570, and the printer code disk character generator output circuit, impedance matching pads, amplifiers and inhibit gates are provided with the buffer 510 between the output conductors 586–592 from the print drum character generator photodiode system 272 of the printer and the input conductors 518–524 of the computer 508.

Gating of the computer output to the printer over computer output conductors 542–548, the printer paper advance gate system 596, the printer input flip-flop reset generator 598 and the print drum character generator photodiode system output over conductors 586–592 is accomplished through the printer select gate circuit 600 in conjunction with the computer printer select line amplifiers and impedance matching pads 602 which receive signals from the computer 508 over the conductors 514 and 516 which determine selection of the printer for use with the computer.

Computer information ready signals from the computer 508 on the output conductor 538 are fed through the computer information output synchronizing circuit 604, containing pulse forming, amplifying and impedance matching portions, to the print strobe generator 606 over conductor 608 which also includes pulse forming circuits and delay net-words so that the signal delivered to the computer input decoding system 610 of the line printer over the conductor 612 is of the proper magnitude and shape. The signal provided on conductor 612 permits use of the signal inputs to the computer input decoding system 610 over conductors 564–570 only after the signal inputs thereto are stable.

The printer paper advance gate system 596 as previously indicated is provided with a gate signal from printer select gate system 600 over conductor 614. The printer paper advance gate system 596 is further provided with a paper advance signal from the computer 508 over conductor 564 and conductor 616. When the gate signal and paper advance signal are present on conductors 614 and 616 a paper advance command signal on output conductor 618 of the buffer 610 is provided from the printer paper advance gate system 596 on receipt of a computer function ready signal from the computer 508 on conductor 620 from the computer function output synchronizing circuit 622 which includes amplifying and impedance matching portions.

The printer input flip-flop reset generator 598 provides a reset signal on conductor 624 for the printer input flip-flops of the computer input decoding system 610 after each piece of information from the computer, whether it be computer function as a paper advance command or information to be printed, has been utilized by the line printer. A reset signal is provided on conductor 624 when a signal from the computer information output synchronizing circuit 604 over conductor 636 or a signal from the computer function output synchronizing circuit 622 over conductor 638 is present on the reception of a gate signal from the printer select gate circuit 600 over conductor 640. The reset signals are provided on the trailing edge of the signals from the computer information output synchronizing circuit 604 and the computer function output synchronizing circuit 622 so that the signals on the printer input flip-flops are stabilized and used before the flip-flops are reset.

The buffer 510 also forms no part of the present invention and will not therefore be considered in further detail. The buffer 510 like the computer 508 has been considered only to provide information as to the use made of the signals on the conductors 560 and 586–592 from the line printer and information as to the origin of signals on input conductors 564–570, 612, 624 and 618 to the line printer.

As shown in FIGURE 4 the hammer control system 502 includes the magnetic pick up unit 269, printer control timer 644, the type command generator and amplifier 646, and reset command generator and amplifier 648. The print control timer 644 in conjunction with the magnetic pick up 269 sequences the operation of the printer including the timing of read out enable signals and printer type and reset commands.

The hammer gate system 504 includes the computer input decoding system 610 and separate hammer gating circuits 656, best shown in FIGURE 6 for each of the 120 print hammers. In operation the hammer gate system receives information or function signals, and strobe and reset signals from the computer 508 through buffer 510. The hammer gate system decodes the information or function signals to determine which printer hammers are to be actuated or which function is to be performed, prepares the hammer gating circuits associated with the indicated printer hammers for firing on reception of a print command and after a print command resets the input decoding system 610 to receive additional information from the computer 508.

Figures 8, 14, 15:
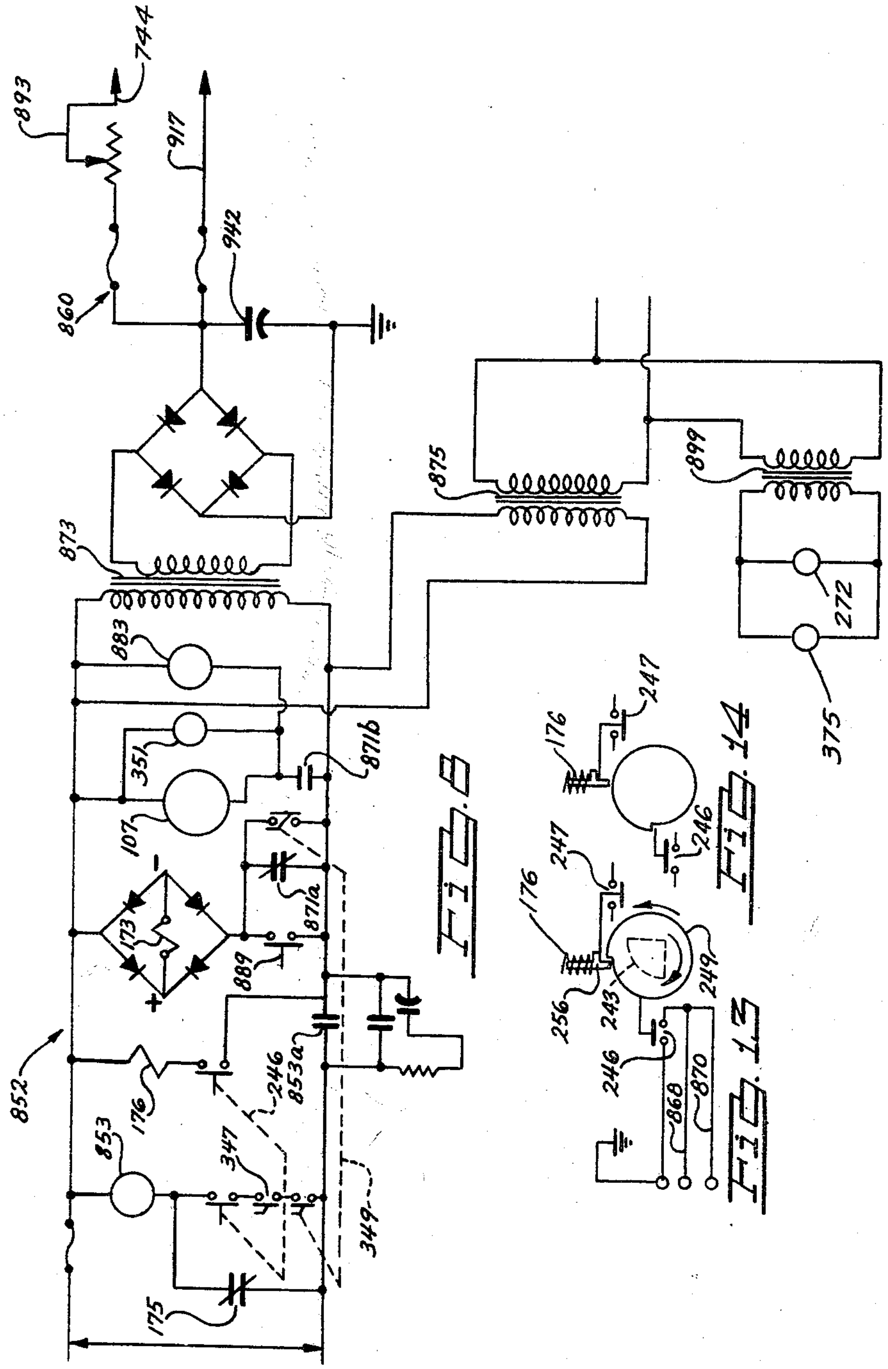

The paper motion spring clutch control system 506 comprises the start paper advance generator 658 including a start paper advance delay one-shot multivibrator 799 and a high power circuit 792 shown in FIGURE 7, paper skip channel select circuit 660, vertical format control photodiode system 375, paper vertical format control circuit 664 including a low power circuit 794 also shown in FIGURE 8, paper motion spring clutch assembly 128 and read out enable circuit 668. In operation, a signal is fed from the start paper advance generator 658 to the paper motion spring clutch assembly to energize the clutch and initiate paper advance motion. Signals from the computer input decoding system 610 and the vertical format control photodiode system 375 are then compared in the paper skip channel select circuit 660 to provide a control signal for the paper vertical format control circuit 664 to de-energize the paper motion spring clutch assembly 128 at the proper time to skip a predetermined number of lines during paper advance. The signals from the start paper advance generator 658 and the paper vertical format control circuit 664 are also used to actuate the read out enable circuit 668 to prevent the printer from requesting input information from the computer during paper advance.

*Hammer control system*

More specifically, the magnetic pick up unit 269 of the hammer control system 502 shown in FIGURE 5 is positioned adjacent the timing disk 265 which as previously indicated is mounted on the hammer actuating cam shaft 267, for rotation therewith. Magnetic pick up probes are known and consist of an electric coil 702 surrounding a magnetic core 704. The reluctance of the magnetic circuit of the magnetic core is varied each time a magnetic member 266 in the periphery of the timing disk passes the core 704 to provide a pulse of electrical energy in the coil 702.

The speed of the timing disk is such that every 6.25 milliseconds an electric impulse is generated in coil 702 which is fed to the delay multivibrator 706. Multivibrator 706 provides an output from the true (T) side thereof to the prime (P) side of the type command control flip-flop 708 and to the reset power amplifier 710 through inverter 712 for .5 a millisecond. Zero power output from the true side of the type command control flip-flop 708 and from reset power amplifier 710 is provided at this time so that power is removed from the collector of all thyristors 650 previously turned on due to signals from the computer input decoding system 610. All thyristors 650 are thus turned off or rendered nonconducting.

At the end of the .5 millisecond reset signal the one-shot multivibrator 706 is triggered by a signal on conductor 716 from the .5 millisecond integral delay 718 to the prime side thereof to provide an output signal from the prime side thereof on the conductor 720 to the true side of the read out enable one-shot multivibrator 722. During the next 2 milliseconds the read out enable one-shot multivibrator 722 produces a printer input request signal on the conductor 560 to indicate to the computer 508 that the printer desires information during this 2 milliseconds.

As previously indicated during this 2 milliseconds the computer interrogates an entire bin of its memory system to find all characters in a complete line of 120 characters which the printer indicates to the computer 508 that it is capable of printing at this time. The particular character to be printed during a complete 6.25 millisecond cycle will of course depend on the position of the printer print drum 109.

Also, during this 2 milliseconds the hammer gate system 504 is operable to provide turn on signals for the thyristors 650 associated with the pulse coils 229 at the hammer positions, of the possible 120 positions on a printed line, indicated by the computer as being the addresses of characters the printer is capable of printing, to prepare the particular thyristors 650 for heavy conduction through the pulse coils 229 in response to a type command signal.

After the two millisecond portion of a 6.25 millisecond cycle of the printer, the read out enable one-shot multivibrator 722 is pulsed on the prime side thereof by a signal on conductor 736 to turn off the read out enable signal to the computer over the conductor 560 and to pulse the type command control flip-flop 708 on the true side thereof over the conductor 738. An output from the type command power amplifier 714 over the conductor 740 is thus provided causing heavy current conduction through the pulse coils 229 of all transistors 650 which were previously turned on during the 2 millisecond input request time.

As previously indicated the coils 229 when energized counteract the magnetic effect of the coils 228 one of which is associated with each of the coils 229 which coils 228 are energized by a constant voltage over conductor 744. Thus the beaver tails of the printer hammers associated with the thyristors 650 which have previously been turned on are permitted to drop into the path of the cam whereby printing of all similar characters at predetermined addresses on a line is accomplished by the printer.

The energizing of the coils 229 and the printing of the characters at the indicated addresses is accomplished during the remaining 3.75 milliseconds of a 6.25 millisecond printer cycle. Thus as the magnetic pick up unit 269 senses the next magnetic element in the timing disk 265 corresponding to the next lobe of the cam a second pulse is applied to the delay reset bus control one-shot multivibrator 706 to again produce a .5 millisecond reset signal and the cycle is repeated to print the next character on the print drum 109.

*Hammer gate system*

The hammer gate system 504 illustrated best in FIGURE 6 comprises seven printer input flip-flops 746–752 and a strobe signal trigger, or print command circuit 754. Eight four input AND gates, only two of which, 756 and 758, are shown, are connected to the strobe trigger circuit 754 and to the flip-flops 746–748. Similarly, fifteen four input OR gates, only two of which 760 and 762, are shown, are connected to the flip-flops 749–752.

The AND and OR gates combined in a double level gating system illustrated diagrammatically in FIGURE 6 define 120 unique conditions representing each of the 120 character addresses or positions on a line of the printer. The output from a different pair of AND and OR gates, for example AND gate 756 and OR gate 760 as shown are connected to the base circuit of each of the 120 thyristors 650 provided in conjunction with hammers 1–120 to permit turning on of the thyristors individually at desired times as previously indicated.

More specifically the seven flip-flops 746–752 receive signals from the computer 508 over buffer output lines 564–570 on their true side. The input to the prime side of the input flip-flops 746–752 is connected to the printer input flip-flop reset generator 598 over conductor 618 from the buffer 510.

Thus in operation during the 2 millisecond period when a printer read out enable signal is sent to the computer 508 from the print control timer 644, coded signals from the computer representing all the addresses of a particular character on a single line to be printed, which the line printer is capable of printing during the particular 6.25 millisecond cycle of operation are serially fed to the printer input flip-flops 746–752. A single set of signals arrives at the printer input flip-flops on investigation of each position in a single bin of the memory system of the computer 508, as previously indicated.

In between the separate sets of signals received from the computer the printer input flip-flops are reset by means of a reset signal fed to the prime side thereof over line 618 from the buffer 510. As previously indicated the strobe input signal from printer strobe generator 606 to the print command circuit 754 over conductor 764 is fed to the line printer after each set of input signals are fed thereto over conductors 564–570 and after the input flip-flops 746–752 have become stable.

Each of the eight AND gates have four inputs thereto, as shown in FIGURE 6. Three of the inputs to the eight AND gates are from the printer input flip-flops 746–748. The other input signal to each of the eight AND gates is from the print command circuit 754. The printer logic is such that when the AND gates receive a signal from each of the four inputs thereto simultaneously the output of the AND gate is a positive ten volts. When any of the inputs to the AND gates is not present the output therefrom is zero volts.

Each of the OR gates similarly has four input signals thereto. The input signals to the OR gates are provided by the printer input flip-flops 749–752. Computer logic is such that when any of the inputs to an OR gate is present the output therefrom is a positive ten volts. When there is no input signal on any of the input lines to an OR gate the output signal therefrom is zero volts.

Thus it can be seen that by connecting each of the eight AND gates to a thyristor input conductor 766 of 15 of the 120 thyristors 650 and by connecting the output of each of the OR gates to the thyristor input conductor 768 of 8 of the 120 thyristors 650 that 120 unique signals present at the printer input flip-flops 746–752 will provide an input to separate ones of the 120 thyristors 650 of ten volts over the input conductors 766 and zero volts over the input conductors 768 which is a necessary condition for turning on the thyristors 650 during the 2 milliseconds in each 6.25 millisecond cycle of the printer during which printer input request or read out enable signals are sent to the computer 508.

Each thyristor 650 is coupled to the outputs of the separate gates such as AND gate 756 and OR gate 760 as indicated in FIGURE 6 through a resistor 770 and capacitor 772 which operate in conjunction with the diode 774 and resistor 786 to provide a turn-on signal at the base of the thyristors 650.

Thus considering the operation of a particular thyristor 650, when the signal input to the printer input flip-flops 746–752 are such that a signal is provided on all four conductors to the AND gate 756 and no signals are present on the conductors to the OR gate 760 the capacitor 772 will be charged through resistor 770 due to the ten volt potential difference thereacross. The strobe signal applied through the print command circuit 754 is then removed from the AND gate 756 after the input flip-flops 746–752 are in a stable state. The voltage at AND gate 756 will therefore drop to zero volts and therefore the voltage at the thyristor goes negative causing the capacitor 772 to discharge through the diode 774 and thyristor 650 sufficient to turn on the thyristor so that during the previously indicated subsequent 3.75 millisecond printer type command the thyristor 650 will conduct heavily through the pulse coil 229 associated therewith to cause printing of the character at the particular hammer address indicated by the signal on printer input flip-flops 746–752.

The thyristor switching circuit as explained above has the advantage over a normal two transistor flip-flop of requiring less circuit components. Further the turn-on time requirements of the pulse coil energizing circuit and the turn-on current are relatively critical in the printer and the thyristor switching circuit explained above meets these requirements.

Thus, in the printer the minimum time between character sensing as governed by the logic speed of the driving computer will be 7 microseconds while the maximum switch time of the thyristor is .15 microsecond. This time differential between time available and time used in thyristor turn-on permits the use of a capacitor coupled thyristor input as described above wherein the input capacitor 772 is slowly charged during the 2 millisecond hammer selection portion of the 6.25 millisecond printer cycle and rapidly discharged at the end of the cycle if the thyristor associated therewith is turned on.

Further, with the thyristor hammer gate circuit, capacitive thyristor input and the double level gating described above, the power requirements of the printer of the invention are kept to a minimum so that maximum drive current required from any OR gate is the current necessary to charge eight one hundred and thirty picofarad twenty kilo-ohm networks in 6 microseconds and the maximum current required from any AND gate is the sum of the current necessary to turn on one thyristor and the discharge current from fourteen thyristor resistance capacitance input networks. The net result is a system of 120 medium current (450 milli-amperes) pulse coils which may be actuated through a low level (25 milli-amperes) gating system by high speed (one megacycle) low level (5 milli-amperes) inputs.

*Paper motion spring clutch control system*

The paper motion spring clutch control system 506, as best shown in FIGURE 7, is provided to advance paper through the printer in response to paper advance signals from the buffer 510 over conductor 618. The number of lines skipped during paper advance by the printer is controlled by the vertical format control photodiode system 375 previously considered, in conjunction with the computer 508. It will be understood that although the number of lines skipped is, in the present discussion, determined jointly by the vertical format control photodiode system 375 and the computer 508, complete control of the vertical format of the printer can be programmed into the printer.

The paper motion spring clutch control system 506 as previously indicated comprises a high power circuit 792 which initiates actuation of the clutch device 128, and a low power circuit 794 which sustains actuation of the clutch. A printer input request inhibit circuit 686, a stop paper advance circuit 798 and a start paper advance delay one-shot multivibrator 799 are also included in the system 506.

In the stop paper advance circuit 798 signals are received by the paper skip channel select circuit 660 over conductors 688–695 from the vertical format control photodiode system 375 and from the computer input decoding system 610 over conductors 681–688. On a preselected combination of the received signals the paper skip channel select circuit 660 provides an output signal on conductor 790 to cause disengagement of the clutch 128 as will later become obvious.

The high power separate clutch actuating circuit 792 includes the start paper advance one-shot multivibrator 800 and the high power paper drive amplifier 802 for energizing the power transistor 804 to cause a high current to be conducted through the paper motion spring clutch solenoid 414. The low power clutch actuating circuit 794 includes the paper drive format control flip-flop 808 and the low power paper drive amplifier 810 for energizing the power transistor 812 to cause current to be conducted through resistor 814 and the paper motion clutch solenoid 414 after transistor 804 is turned off. The printer input request inhibit circuit 686 includes the OR gate 816 and the printer input request inhibit one-shot multivibrator 818. It will be noted that the multivibrators 799, 800 and 818 include time delay circuits 820, 822, and 824, respectively, integrally associated therewith.

In operation the paper motion spring clutch control system 506 receives a start paper advance input signal from computer 508 over the conductor 618 from the buffer 510 after a line has been printed. The true side of the start paper advance delay multivibrator 799 is triggered by the signal from computer 508 and provides an output signal on conductor 827 to trigger the true side of multivibrator 808. Multivibrator 800 is triggered on the true side by a signal from the true side of multivibrator 799 after a time delay of for example 5 milliseconds which is sufficient to permit the mechanical portions of the printer to reach a static condition and prevent tearing of the printer paper. The time delay is diagrammatically indicated as delay 801.

In the high power circuit 792 for actuating the clutch solenoid 414 the output of the multivibrator 799 on conductor 826 is fed to the true side of the start paper advance multivibrator 800 to produce an output on conductor 834 which when amplified through the high power paper drive amplifier 802 will cause high conduction of the power transistor 804 to cause a high current to pass through the paper motion spring clutch solenoid 414. The input to the amplifier 802 over conductor 834 is maintained for a period determined by the delay 822 which is an integral part of multivibrator 800 after which it is stopped due to an input to the prime side of multivibrator 800.

Thus the major function of the high power clutch actuating circuit 792 is to provide a high current impulse through the paper motion spring clutch solenoid 414 for a relatively short period after the reception of a start paper advance command fed thereto through delay 801. This high current signal through solenoid 414 overdrives the solenoid 414 for a very short time whereby the initial engagement of the spring clutch is extremely rapid to facilitate the starting of the paper advance rapidly. The high power signal through solenoid 414 is sufficient to advance the printer paper no more than one vertical space.

High power is not required to maintain the spring clutch 128 engaged during multiple space skipping. Therefore, if multiple space paper advance is indicated by the signal on conductor 790 from the paper skip channel select circuit 660, the solenoid 414 is energized by current passed through transistor 812 in the low power actuating circuit 794 after transistor 804 is turned off due to the signal received at the transistor 812 through the amplifier 810 from flip-flop 808 which produces an output on conductor 830 in response to a signal from the true side of multivibrator 799.

The spring clutch will be energized through transistor 812 after transistor 804 is turned off until a stop paper advance signal is sent to the low power clutch actuating circuit 794 over the conductor 790 to the prime side of the flip-flop 808. At this time the transistor 812 is caused to stop conducting and the clutch becomes disengaged to stop paper advance.

The printer input request inhibit circuit 686 as previously indicated includes the OR gate 816 which receives signals over conductor 825 from the multivibrator 799, from conductor 834 in the high power circuit 792 and from conductor 830 in the low power circuit 794. Thus a signal output is provided on conductor 848 from the OR gate 816 at the time the paper advance signal is received over conductor 618.

Conductor 848 supplies a signal input to the true side of the printer input request inhibit one-shot multivibrator 818 whereby a signal is provided on conductor 850 which is operable to prevent a read out enable signal from the printer from being sent to the computer 508 during the period of paper advance. Further, the inhibit signal on conductor 850 is maintained for a period determined by the delay 824 after the output on conductor 848 indicates stopping of paper advance to permit sufficient time for the paper drive mechanism and paper to come to a complete stop. Time delay 824 is integral with the multivibrator 818.

Thus it can be seen that with the paper motion spring clutch control system 506 the line printer paper may be advanced a predetermined number of spaces with a minimum of required power due to the fact that the heavy current necessary to actuate the spring clutch quickly is not needed or used to maintain the spring clutch actuated. Further an inhibit signal is provided to prevent printing by the line printer during paper advance and for a predetermined time before and after actual paper advance which will allow the mechanical components and printer paper to come to a static condition regardless of the number of spaces skipped.

*Power supply portion*

Figure 9:
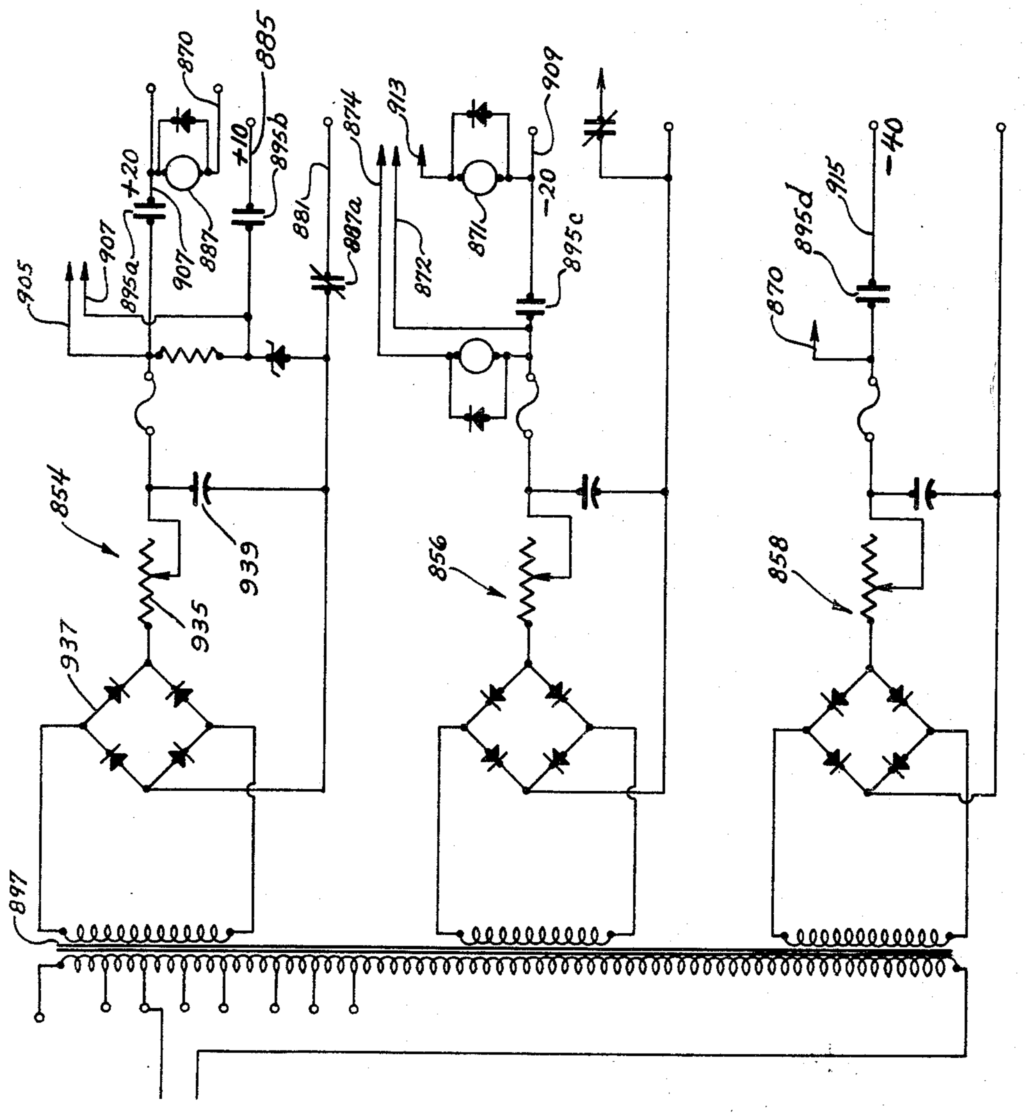

The printer power supply illustrated in FIGURES 8 and 9 operates from a line voltage of 95–125 volts, 60 c.p.s., and requires 7 amperes. All electrically operated components of the printer receive their power from the power supply. Five regulated voltages are generated: +10, +20, −20, and −40 volts, direct current and 11 volts alternating current. An unregulated voltage, nominally −20 volts, direct current, is also generated for use in energizing the hammer magnet hold coils and paper advance spring clutch solenoid 806.

The power supply includes the control circuit 852 and the separate circuits 854, 856, 858 and 860 including constant voltage transformers for producing the indicated regulated and unregulated voltages. A voltage sensing circuit 862, and hammer cycle and unregulated voltage check circuits 864 and 866 respectively illustrated in FIGURES 10, 11 and 12 respectively are also included in the power supply.

Additionally the power supply includes means for generating a printer ready signal and a clear signal. The printer ready signal is fed to the computer to indicate to the computer that the printer is ready for operation. The clear signal is fed to printer elements which require a specific state of operation before the printer will function correctly to insure such state of operation before the printer is cycled.

The control circuit 852, the power supply circuits 854, 856, 858 and 860, voltage sensing circuit 862, and hammer cycle and unregulated voltage check circuits 864 and 866 are so related as to prevent extensive damage to the printer should component break down occur during printer continuous run procedure and to divide the load on the power circuits during printer turn-on procedure. In this latter connection the power supply is sequenced to first provide energy to prepare the hammers for operation as considered in connection with the bail bar, subsequently energize the power supplies and then start the printer drive motor.

*Control circuit*

Refering to FIGURE 8 the control circuit 852 will be considered in conjunction with the turn-on procedure of the printer.

Voltage is applied to relay 853 when the power-in switch 246 is held closed, provided drum-arm-down interlock switch 347 and drum-arm-clamped interlock switch 349 are both closed. Latch position switch 247 is open at this time since the bail bar 243 (FIGURE 13) is in the non-print position and the latch 256 is down as shown in FIGURE 13. Closure of relay contacts 853A applied voltage to latch solenoid 176 through the power-on switch, to bail-bar solenoid 173 through the normally closed contacts 871A of relay 871 shown in FIGURE 9, and to transformers 873 and 875.

As previously indicated, application of voltage to the bail-bar solenoid 173 rotates the bail-bar so that it presses the armatures of the spring biased levers of the hammer actuating interposer systems against the pole piece of the electromagnets 226 associated therewith. At the same time the sidewise force which the bail-bar had been exerting on the latch 256 is removed. The latch 256 is thus lifted by its solenoid 176 to free the bail bar for rotation to the print position upon the removal of voltage from its solenoid 173.

Figure 11:
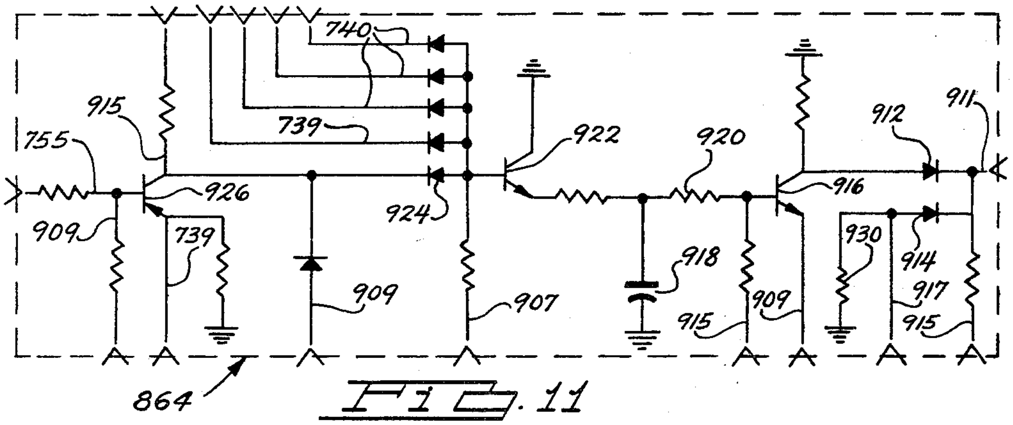
Figures 10, 12:
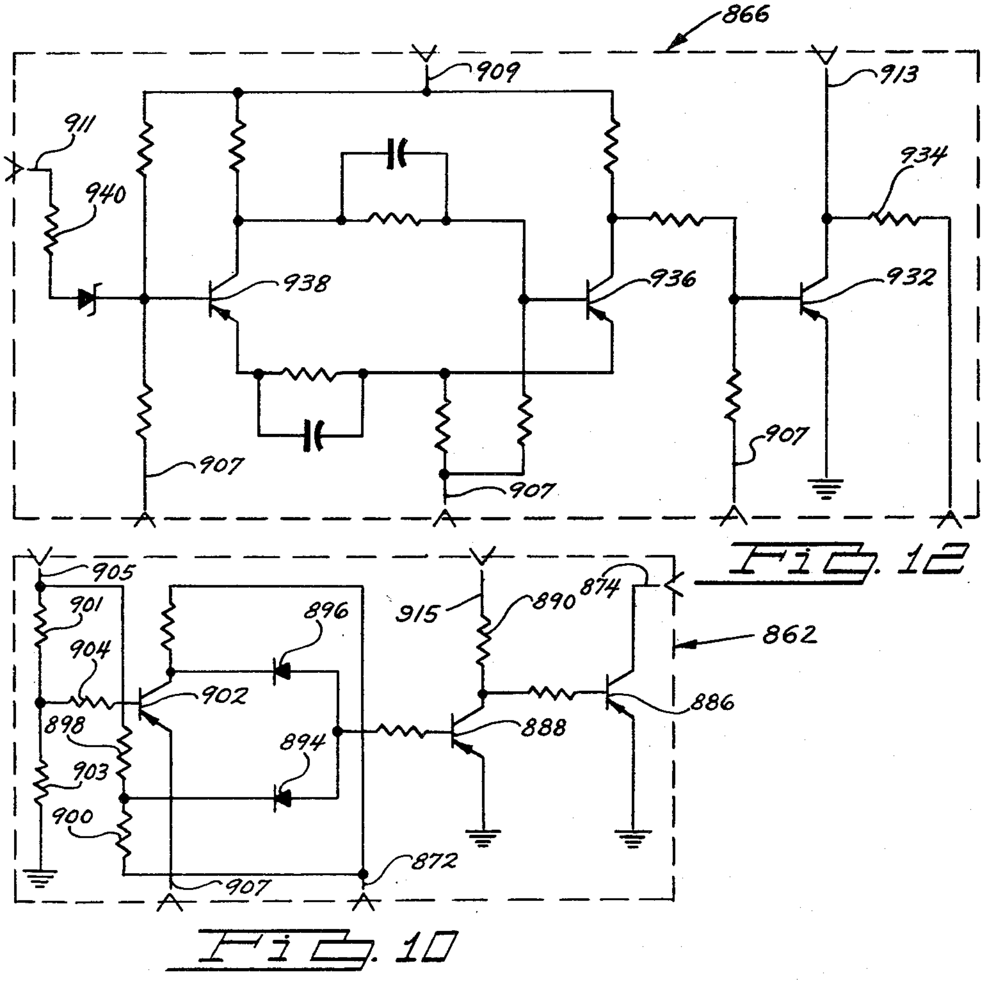

When all regulated voltages are present, the voltage sensing circuit illustrated in FIGURE 10 permits operation of relay 895 illustrated in FIGURE 9 connected thereto by conductor 874. Operation of relay 895 closes the relay contacts 895A, 895B, 895C and 895D to distribute the regulated direct current +20, +10, −20 and −40 volt voltages respectively over conductors 907, 885, 909 and 915 respectively. When the unregulated direct current voltage applied to the printer holding coils reaches a level which will hold the spring biased levers of the hammer actuating interposers in the non-print position, and provided no print commands are being received over print command bus 740 as determined by the hammer cycle check circuit 864 illustrated in FIGURE 11, the unregulated voltage check circuit 866 illustrated in FIGURE 12 permits energization of relay 871 shown in FIGURE 9 over conductor 913.

Energization of relay 871 closes relay contacts 871*b* and starts the main drive motor 877, ribbon motor 879 and printer blower motor 883. Operation of relay 871 also opens relay contacts 871*a* to remove voltage from the bail-bar solenoid 173 so that the bail-bar 243 under spring urging rotates past the latch 256 to the print position. The power-on switch 246 may now be released, since the latch 256 can no longer restrain the bail-bar 243, the lifted position of the latch armature operates latch position switch 247 to bypass switches 246, 347 and 349 and maintain current through relay 853.

When the bail-bar reaches the print position, it operates printer-ready switch 246. The output conductor 868 is connected to ground through the printer-ready switch 246 to complete an electric circuit therethrough and conveys a "printer ready" signal to operate an indicator light on the computer 508. The other output conductor 870 applies voltage to time-delay relay 887. The time delay relay is energized after a delay which allows the main-drive motor 877 to reach full speed before removing the clear signal which has been sent to the printer electronic elements requiring a specific operating state before printer cycling is started. Removal of the clear signal permits normal cycling of the reset and print pulses and thereby subjects these pulses to subsequent check by the hammer cycle check circuit 864. The removal of the clear signal also allows data input to the printer by permitting "read out enable" signal over conductor 560 from the electronic portion 500 of the printer to the computer 508 to become true, which controls when the computer can feed information to the printer.

Printer shut-down may be initiated in one of three ways, closure of power-off switch 889, closure of drum-arm-clamped interlock switch 349 or removal of voltage from relay 871 to energize bail-bar solenoid 173. Voltage is removed from relay 871 upon the occurrence of low hammer holding coil voltage or improper hammer cycling, as detected by the unregulated voltage check circuit 866 or hammer cycle check circuit 864.

The application of voltage to bail-bar solenoid 173 causes the bail-bar to rotate to the non-print position as shown in FIGURE 13. Upon leaving the print position, the bail-bar cam 249 opens printer-ready switch 246. The conductor 868 consequently conveys the status "printer not ready" to the indicator on computer 508. The other conductor 870 associated with the printer-ready switch 246 removes voltage from the time delay relay 887 and applies a clear signal to the printer flip-flops. When the bail-bar reaches the non-print position, the latch 256, under spring urging, drops down to restrain the bail-bar when voltage is removed from the bail-bar solenoid 173. Latch position switch 247 is opened when the latch armature is fully down, removing voltage from relay 853, thus removing power from the printer.

*Voltage producing and sensing circuits*

With regard to the regulated voltage producing circuits 854, 856 and 858, the output of constant-voltage transformer 875 applies 118 volts to the input of regulated-voltage transformer 897 and photodiode-lamp transformer 899. Transformer 899 applies 11 volts to the photodiode lamps. Rheostats 935 are placed between the full-wave rectifiers 937 and filter capacitor 939 of each voltage producing circuit 854, 856 and 858 for the purpose of adjusting the magnitude of the output voltage if required.

Unregulated voltage transformer 873 of circuit 860 charges capacitor 942 to a nominal −20 volts. With variations in line voltage and loading, the voltage may range between −16 volts and −25 volts. The unregulated voltage is used to drive the pulse and holding coils 229 and 228 and the paper-advance solenoid. The steady voltage applied to the holding coils 228 is reduced by the drop across rheostat 893, and ranges between −12 volts and −19.5 volts. Steady holding coil current ranges between 4 amperes and 5.5 amperes.

The voltage sensing circuit of FIGURE 10 energizes relay 895 by grounding the relay through conductor 874 when all regulated voltages are present. Contacts 895*a*, 895*b*, 895*c* and 895*d* are closed on energization of relay 895 to distribute the regulated direct current voltages.

Operation of relay 895 requires the presence of ground on the conductor 874 and −20 volts direct current on conductor 872, which checks the −20 volt voltage. Ground is obtained when transistor 886 is turned on, which requires that transistor 888 be turned off and −40 volts be applied to resistor 890 through conductor 870, which checks the −40 volts. Transistor 888 will be turned off if it does not receive base drive through either of the input diodes 894 or 896. Diode 894 connects to a voltage divider including resistors 898 and 900 and turns on transistor 888 if +20 volts is not present on conductor 905, which checks this voltage. Diode 896 will conduct current to turn on transistor 888 unless transistor 902 is turned on. Transistor 902 is turned on if the +10 volts on conductor 907 exceeds the voltage between resistors 901 and 903 and causes resistors 904 to carry enough current to cause the collector of transistor 902 to become positive, which checks the +10 volts.

Thus it will be apparent that if any of the regulated voltages are not present or are not of proper magnitude that relay 895 will not be energized. Consequently the regulated voltages will not be applied to the printer and the printer will not operate unless the voltages are all present at the proper magnitude.

*Hammer cycle and unregulated voltage check circuit*

The hammer cycle check circuit 864 of FIGURE 11 will shut down the printer if hammers are being improperly cycled due to a constant print command on any of the plurality of parallel printer type command busses 740, or a constant printer information request or read out enable signal on conductor 560 or if no reset signal is produced on reset buss 739 which conditions could seriously damage the printer if printer power were supplied while they continued to exist.

The printer is shut down under these conditions by generating, from the hammer cycle check circuit 864, a voltage which causes the unregulated voltage check circuit 866 to remove voltage from relay 871 connected to the voltage check circuit 866 over conductor 913. The unregulated voltage check circuit 866 responds to a voltage of predetermined magnitude which voltage is determined by the magnitude of the unregulated voltage or the output of the hammer cycle check circuit. The unregulated voltage is fed to the hammer cycle check circuit over the conductor 917 and is gated at diode 914. The signal of the hammer cycle check circuit is gated at diode 912. The signal from the gate diodes 912 and 914 are fed over conductor 911 to circuit 866.

The hammer cycle check circuit will generate a voltage which when gated at diode 912 will shut down the printer if transistor 916 is turned off. Transistor 916 is turned on due to the current through resistor 920 which is regulated by the capacitor 918. Unless capacitor 918 is periodically discharged by conduction of transistor 922, it will become fully charged and transistor 916 will turn off. Capacitor 918 will be normally discharged during each reset time due to the reset signal fed to the hammer cycle check circuit over conductor 739. The time constant of resistor 920 and capacitor 918 is made long enough so that transistor 916 will remain steadily on if capacitor 918 is discharged during each reset time.

The condition for turning on transistor 922 is that all inputs to the gate at its base be at ground. Logically, all inputs from the print command conductors 740 must be false, the reset signal over conductor 739 must be true, and to put the input to diode 924 at ground the strobe signal on conductor 755 must be false. A false strobe signal corresponds to ground and will turn on transistor 926, placing its collector at ground. A true strobe signal corresponds to +10 volts and will turn off transistor 926, clamping its collector to −20 volts.

The unregulated voltage check circuit 910 will shut down the printer if the unregulated voltage falls too low. The printer is shut down by removing voltage from relay 871 in FIGURE 9.

The unregulated voltage, which is normally −20 volts, is gated with the output of the hammer cycle check circuit 864, at diodes 912 and 914. Resistor 930 provides a path to low voltage if the unregulated voltage is not connected to circuit 864 over conductor 917.

Voltage is removed from relay 871 by turning off transistor 932. Upon turning off, the collector voltage of transistor 932 is coupled through resistor 934 to cause "read out enable" to immediately become false. Transistor 932 is turned off by conduction of transistor 936.

Transistors 936 and 938 form a Schmitt trigger. Transistor 938 turns off and transistor 936 turn on, when the voltage input to resistor 940 falls (in the absolute sense) to −16 volts. The state of the Schmitt trigger is reversed when the voltage rises (again, in the absolute sense) to −18 volts.

Thus it will be readily apparent that the hammer cycle and unregulated voltage check circuits function in combination to shut down the printer automatically if the printer cycle is not correct due to a constant print command on busses 740, a constant strobe signal or print command on conductor 755 or no reset signal on conductor 739 or to shut down the printer if the unregulated voltage falls to a level below that required to maintain the hammer actuating levers in a non-print position. The hammer cycle and unregulated voltage check circuits also are seen to stop read out of computer information under the same cycle and unregulated voltage conditions. Therefore both serious damage to the printer and loss of information from the computer are prevented by the hammer cycle and unregulated voltage check circuit in combination which would otherwise occur on improper printer cycling or voltage level occurring.

What we claim as our invention is:

1. In a printer for typing lines of information in response to received signals having a power supply energized through a control circuit for providing the printer with an unregulated voltage and means for cycling the printer through reset, read and type command times including a plurality of type command buses, a reset bus and a strobe signal bus and means for producing predetermined signals on each of said buses during the reset time on predetermined cycling of the printer, means for checking the cycling the printer, comprising a relay in said control circuit operable on being deenergized to deenergize the printer power supply, a voltage checking circuit connected to said relay for energizing said relay when the voltage input thereto is above a predetermined magnitude and a cycle checking circuit connected to each of said buses and said voltage checking circuit for providing said voltage checking circuit with a voltage above said predetermined magnitude only when the signals on each of the buses are at ground potential.

2. Structure as claimed in claim 1 wherein the voltage checking circuit comprises a Schmitt trigger circuit having an input circuit including a zenner diode in series with a voltage divider and an output circuit including said relay in series with a transistor the base of which is connected to the output circuit of the trigger circuit.

3. Structure as claimed in claim 1 wherein the cycle checking circuit includes a diode gate for gating an electric signal to said voltage checking circuit greater than said predetermined magnitude only when the unregulated voltage is above said predetermined magnitude.

4. Structure as claimed in claim 1 wherein the cycle checking circuit includes a transistor, a diode gate connected to said transistor for gating an electric signal to said voltage checking circuit greater than said predetermined magnitude on conduction of said transistor, and means for maintaining the transistor in a state of conduction when the printer is cycled in a predetermined manner.

5. Structure as claimed in claim 4 wherein the means for maintaining the transistor in a state of conduction comprises a capacitor and resistor in series with a power source connected to the base of the transistor and means for discharging the capacitor during each reset time when the signals on each of the buses are at ground potential.

6. Structure as claimed in claim 5 wherein the means for discharging the capacitor during each reset time comprises a second transistor connected in series therewith operable to conduct only when its base is at ground potential and means for connecting the base of the second transistor directly to the type command buses and reset bus and to means for providing a ground potential during reset time when a strobe signal is provided during printer read time.

7. In a printer for typing lines of information in response to received signals having a power supply energized through a control circuit for providing the printer with an unregulated voltage and means for cycling the printer through reset, read and type command times including a plurality of type command buses, a reset bus and a strobe signal bus and means for producing predetermined signals on each of said buses during the reset time on predetermined cycling of the printer, means for checking the cycling of the printer, comprising a relay in said control circuit operable on being deenergized to deenergize the printer power supply, a voltage checking circuit connected to said relay for energizing said relay when the voltage input thereto is above a predetermined magnitude and a cycle checking circuit connected to each of said buses and said voltage checking circuit for providing said voltage checking circuit with a voltage below said predetermined magnitude when the signal on said type command buses is above ground potential.

8. In a printer for typing lines of information in response to received signals having a power supply energized through a control circuit for providing the printer with an unregulated voltage and means for cycling the printer through reset, read and type command times including a plurality of type command buses, a reset bus and a strobe signal bus and means for producing predetermined signals on each of said buses during the reset time on predetermined cycling of the printer, means for checking the cycling of the printer, comprising a relay in said control circuit operable on being deenergized to deenergize the printer power supply, a voltage checking circuit connected to said relay for energizing said relay when the voltage input thereto is above a predetermined magnitude and a cycle checking circuit connected to each of said buses and said voltage checking circuit for providing said voltage checking circuit with a voltage below said predetermined magnitude when the signal on said reset bus is above ground potential.

9. In a printer for typing lines of information in response to received signals having a power supply energized through a control circuit for providing the printer with an unregulated voltage and means for cycling the printer through reset, read and type command times including a plurality of type command buses, a reset bus and a strobe signal bus and means for producing predetermined signals on each of said buses during the reset time on predetermined cycling of the printer, means for checking the cycling of the printer, comprising a relay in said control circuit operable on being deenergized to deenergize the printer power supply, a voltage checking circuit connected to said relay for energizing said relay when the voltage input thereto is above a predetermined magnitude and a cycle checking circuit connected to each of said buses and said voltage checking circuit for providing said voltage checking circuit with a voltage below said predetermined magnitude when the signal on said strobe signal bus is above ground potential.

10. In a printer for typing lines of information in response to received signals having a power supply energized through a control circuit for providing the printer with an unregulated voltage and means for cycling the printer through reset, read and type command times including a plurality of type command buses, a reset bus and a strobe signal bus and means for producing predetermined signals on each of said buses during the reset time on predetermined cycling of the printer, means for checking the cycling of the printer, comprising a relay in said control circuit operable on being deenergized to deenergize the printer power supply, a voltage checking circuit connected to said relay for energizing said relay when the voltage input thereto is above a predetermined magnitude and a cycle checking circuit connected to each of said buses and said voltage checking circuit for providing said voltage checking circuit with a voltage above said predetermined magnitude only when the magnitude of the unregulated voltage is above a predetermined magnitude.

11. In a printer for typing lines of information in response to received signals having a power supply energized through a control circuit for providing the printer with an unregulated voltage and means for cycling the printer through reset, read and type command times including a plurality of type command buses, a reset bus and a strobe signal bus and means for producing predetermined signals on each of said buses during the reset time on predetermined cycling of the printer, means for checking the cycling of the printer, comprising a relay in said control circuit operable on being deenergized to deenergize the printer power supply, a voltage checking circuit connected to said relay for energizing said relay when the voltage input thereto is above a predetermined magnitude and a cycle checking circuit connected to each of said buses and said voltage checking circuit for providing said voltage checking circuit with a voltage above said predetermined magnitude when the signals on each of the buses are at ground potential and the magnitude of the unregulated voltage is above a predetermined magnitude.

12. In a cyclically operative printer for typing lines of information in response to received signals wherein said printer has a power supply and a control circuit, said power supply being energized through said control circuit for providing the printer with an unregulated voltage and means for cycling the printer; means for checking the cycling of the printer comprising apparatus in said control circuit operable on actuation to deenergize the printer power supply; a voltage checking circuit connected to said apparatus for actuating said apparatus when the voltage input to the voltage checking circuit is of a predetermined magnitude; and a cycle checking circuit operably associated with said voltage checking circuit and said apparatus for providing said voltage checking circuit with said predetermined voltage only when the printer is cycled in a predetermined manner.

13. Structure as set forth in claim 12 wherein the apparatus operable on being actuated to deenergize the printer power supply is a relay, and the voltage checking circuit comprises a Schmitt trigger circuit having an input circuit including a zener diode in series with a voltage divider.

14. Structure as set forth in claim 13 wherein the voltage checking circuit further includes an output circuit comprising a transistor having the emitter collector circuit in series with said relay, the base of which transistor is connected to the output of the trigger circuit.

15. Structure as claimed in claim 6 wherein the cycle checking circuit includes a transistor, a diode gate connected to said transistor for gating an electric signal operable to maintain said apparatus in an unactuated state on conduction of said transistor and means for maintaining the transistor in a state of conduction when the printer is cycled in the predetermined manner.

16. Structure as set forth in claim 15 wherein the means for maintaining the transistor in a state of conduction comprises a capacitor and resistor in series with a power source connected to the base of the transistor and means for discharging the capacitor during each cycle of operation of the printer when the printer is not cycled in the predetermined manner.

References Cited by the Examiner

UNITED STATES PATENTS

| | | | |
|---|---|---|---|
| 2,766,686 | 10/56 | Fomenko et al. | 101—93 |
| 2,897,752 | 8/59 | Malmros et al. | 101—93 |
| 2,915,967 | 12/59 | Gehring et al. | 101—93 |
| 2,954,731 | 10/60 | Durano et al. | 101—93 |

WILLIAM B. PENN, *Primary Examiner.*